US010414590B2

(12) United States Patent
Guo

(10) Patent No.: US 10,414,590 B2
(45) Date of Patent: Sep. 17, 2019

(54) SPRING-BIASED BRAKE MECHANISM FOR PALLET STORAGE SYSTEMS AND PALLET STORAGE SYSTEMS INCORPORATING SUCH BRAKE MECHANISMS

(71) Applicant: Xiaoyu Guo, Stony Brook, NY (US)

(72) Inventor: Xiaoyu Guo, Stony Brook, NY (US)

( * ) Notice: Subject to any disclaimer, the term of this patent is extended or adjusted under 35 U.S.C. 154(b) by 5 days.

(21) Appl. No.: 15/818,965

(22) Filed: Nov. 21, 2017

(65) Prior Publication Data

US 2019/0152705 A1  May 23, 2019

(51) Int. Cl.
*B65G 13/075* (2006.01)
*B65G 47/88* (2006.01)

(52) U.S. Cl.
CPC ....... *B65G 13/075* (2013.01); *B65G 47/8823* (2013.01)

(58) Field of Classification Search
CPC .......................... B65G 13/075; B65G 47/8823
USPC ........................................................... 193/40
See application file for complete search history.

(56) References Cited

U.S. PATENT DOCUMENTS

| 9,475,658 | B2* | 10/2016 | Matsumoto | ........ B65G 47/8823 |
| 2009/0140506 | A1* | 6/2009 | Fischer | .................. B60G 7/003 |
| | | | | 280/86.758 |
| 2018/0235156 | A1* | 8/2018 | Blair | ........................ A01G 9/18 |
| 2018/0265305 | A1* | 9/2018 | Loizeau | ................. B65G 13/00 |

* cited by examiner

*Primary Examiner* — Gene O Crawford
*Assistant Examiner* — Lester Ill Rushin
(74) *Attorney, Agent, or Firm* — Carter, DeLuca & Farrell, LLP

(57) ABSTRACT

A brake mechanism for a pallet storage system includes a leg defining a stop surface and movable between a stop position, wherein the stop surface is disposed within a travel path of a pallet traveling along a pallet storage system, and a go position, wherein the stop surface is displaced from the travel path. A biasing mechanism having a spring force is coupled to the leg and configured to bias the leg towards the stop position such that the spring force is required to be overcome to permit the leg to move from the stop position to the go position. Pallet storage systems including at least one of such brake mechanisms are also provided.

18 Claims, 4 Drawing Sheets

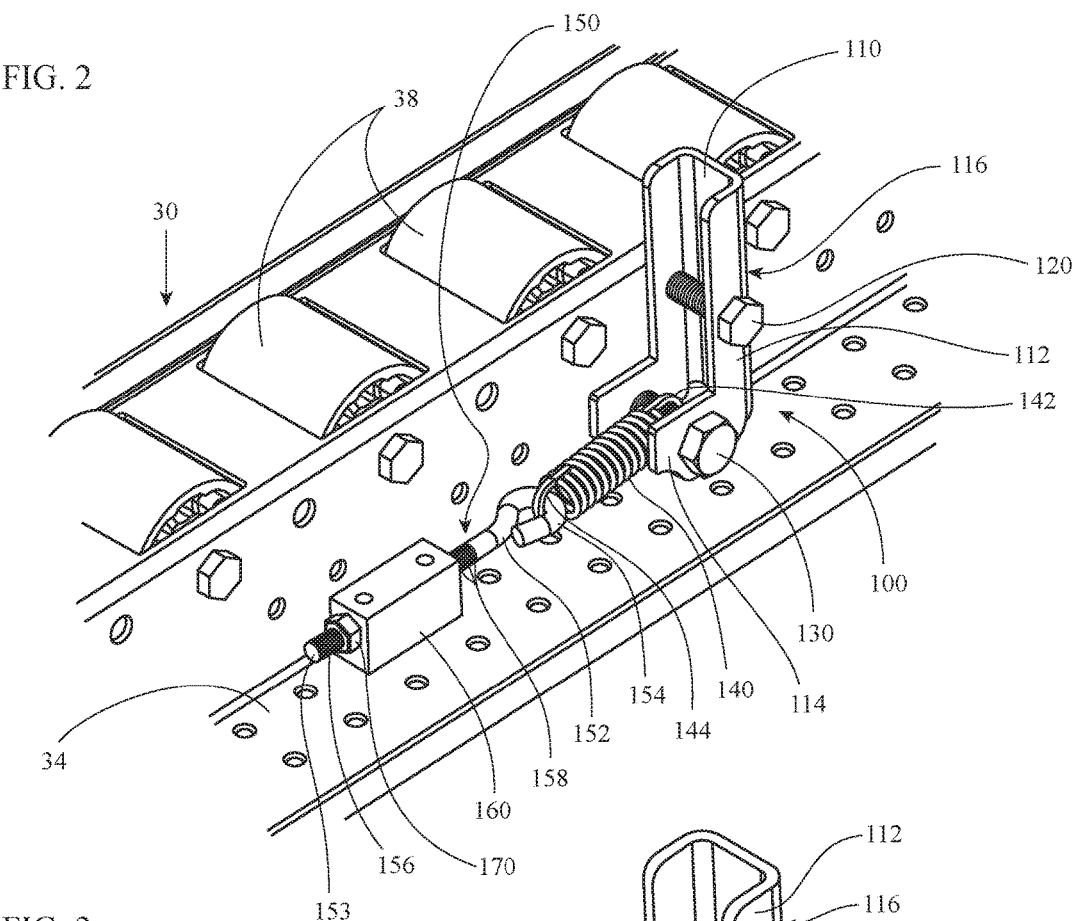
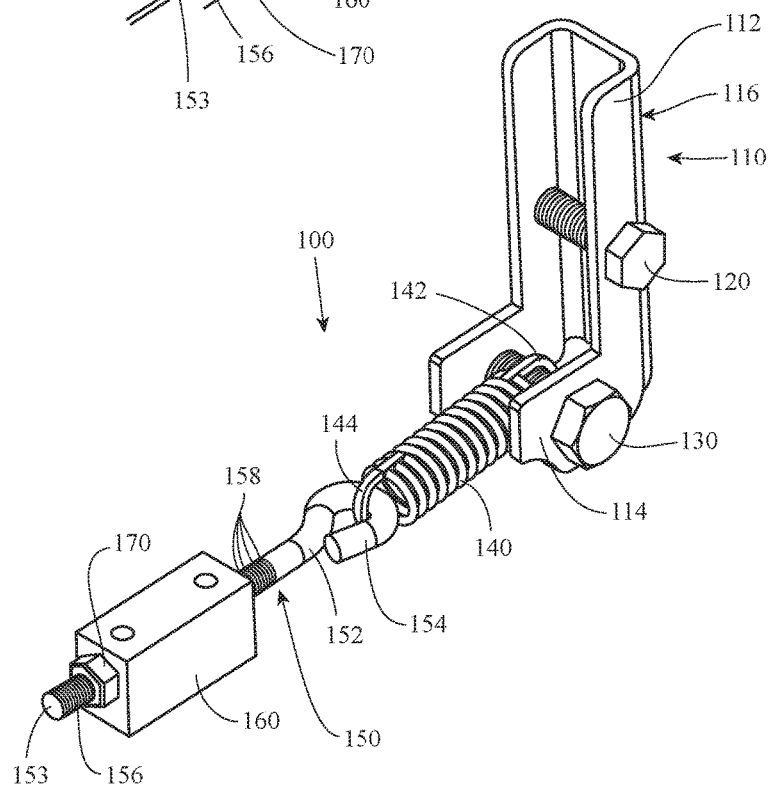

SPRING-BIASED BRAKE MECHANISM FOR PALLET STORAGE SYSTEMS AND PALLET STORAGE SYSTEMS INCORPORATING SUCH BRAKE MECHANISMS

TECHNICAL FIELD

The present disclosure relates to pallet storage systems and, more particularly, to a spring-biased brake mechanism for pallet storage systems and pallet storage systems incorporating such brake mechanisms.

BACKGROUND

Storage warehouses employ various different storage systems to facilitate the transport and storage of palletized items. Gravity-based First-In-First-Out (FIFO) storage systems, for example, are advantageous in that they facilitate both the loading and unloading of pallets. A gravity-based FIFO storage system generally includes an inclined conveyor having an upper loading end, where pallets are loaded onto the conveyor, and a lower unloading end, from which pallets may be removed from the conveyor. In use, a pallet loaded onto the conveyor at the upper loading end travels along the conveyor under the force of gravity from the upper loading end towards the lower unloading end, where the pallet eventually contacts a stop at the lower unloading end of the conveyor or a previously-loaded pallet or pallets that are stacked against the stop.

However, while gravity-based FIFO storage systems are efficient for loading and unloading of pallets, pallets pick up speed as they are moved along the conveyor under gravity. Depending upon the incline of the conveyor, the length of the conveyor, the weight of the pallet, the weight distribution of the pallet, etc., the pallet may reach a high rate of speed and eventually crash into the stop, flip over the stop, and/or crash into other pallets. Damage to the palletized items, the pallets themselves, the storage systems, nearby items, and/or injuries to workers may result.

It would therefore be advantageous to provide a brake mechanism for pallet storage systems that reduces the speed of pallets traveling along the inclined conveyor, ensuring that the pallets do not reach potentially dangerous high-rates of speed. It would further be advantageous to provide a brake mechanism for pallet storage systems that is selectively adjustable to enable adaptation to a particular situation based on, for example, the incline of the conveyor, the length of the conveyor, the weight of the pallets, the weight distribution of the pallets, the number of brake mechanisms utilized, the layout of the brake mechanisms, etc.

SUMMARY

The present disclosure provides a brake mechanism configured to reduce the speed of pallets traveling along an inclined conveyor, ensuring that the pallets do not reach potentially dangerous high-rates of speed. The brake mechanism is selectively adjustable to enable adaptation to a particular situation. Also provided in accordance with the present disclosure is a pallet storage system incorporating such brake mechanisms. These and other aspects and features of the present disclosure are detailed below. To the extent consistent, any of the aspects and features described herein may be used in conjunction with any or all of the other aspects and features described herein.

Provided in accordance with aspects of the present disclosure is a brake mechanism for a pallet storage system. The brake mechanism includes a leg defining a stop surface and movable between a stop position, wherein the stop surface is disposed within a travel path of a pallet traveling along a pallet storage system, and a go position, wherein the stop surface is displaced from the travel path. The brake mechanism further includes a biasing mechanism having a spring force. The biasing mechanism is coupled to the leg and configured to bias the leg towards the stop position such that the spring force is required to be overcome to permit the leg to move from the stop position to the go position.

In an aspect of the present disclosure, the biasing mechanism is adjustable to vary the spring force of the biasing mechanism. In such embodiments, the biasing mechanism includes an adjuster selectively movable to vary the spring force of the biasing mechanism.

In another aspect of the present disclosure, the adjuster is continuously adjustable.

In still another aspect of the present disclosure, the biasing mechanism includes an extension coil spring. In such aspects, moving an adjuster varies a pre-tension on the extension coil spring.

In yet another aspect of the present disclosure, the biasing mechanism includes a biasing member coupled to the leg and at first end and to a rod at a second end. In such aspects, an adjuster is disposed about the rod and selectively movable to move the rod relative to the leg.

In still yet another aspect of the present disclosure, an adjuster is threadingly engaged about the rod.

In another aspect of the present disclosure, the biasing mechanism further includes a block. The rod extends through the block with an adjuster disposed on a first side of the block and the biasing member disposed on a second side of the block.

In yet another aspect of the present disclosure, the leg is pivotable between the stop position and the go position.

In still another aspect of the present disclosure, in the stop position, the stop surface is generally vertically oriented and, in the go position, the stop surface is generally horizontally oriented.

A pallet storage system provided in accordance with aspects of the present disclosure includes at least one rack, at least one a conveyor supported on the at least one rack, and at least one brake mechanism. The at least one conveyor is disposed at an angle such that a loading end of the conveyor is inclined relative to an unloading end of the conveyor. The at least one brake mechanism is operably coupled to the at least one conveyor and may be configured similar to any of the aspects detailed above or otherwise detailed herein.

In an aspect of the present disclosure, the at least one conveyor includes at least one roller track and, in some aspects, a pair of spaced-apart roller tracks.

In another aspect of the present disclosure, the at least one brake mechanism includes a plurality of aligned pairs of brake mechanisms disposed along the lengths of the spaced-apart roller tracks.

In yet another aspect of the present disclosure, the at least one conveyor includes a stop disposed at the unloading end thereof.

BRIEF DESCRIPTION OF THE DRAWINGS

Various aspects and features of the present disclosure are described hereinbelow with reference to the drawings wherein like numerals designate similar elements in each of the several views and:

FIG. 2 is an enlarged, perspective view of the portion of the pallet storage system of FIG. 1 indicated as "2" in FIG. 1, illustrating a brake mechanism of the pallet storage system in accordance with the present disclosure;

FIG. 3 is an enlarged, perspective view of the brake mechanism of FIG. 2;

DETAILED DESCRIPTION

Figure 1:
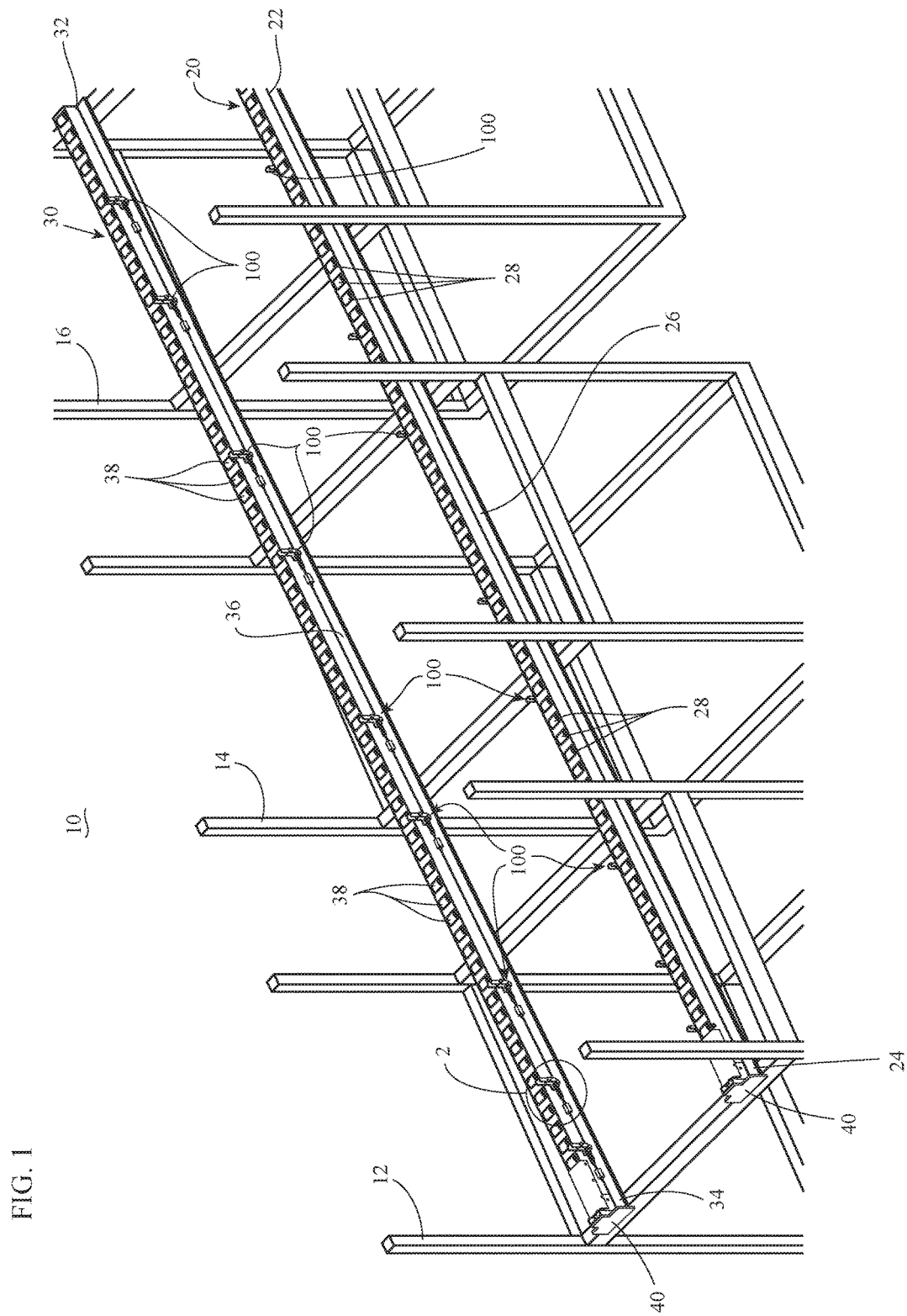
FIG. 1 is a perspective view of a pallet storage system in accordance with the present disclosure.

Referring to FIG. 1, a pallet storage system provided in accordance with the present disclosure is shown generally designated by reference numeral 10. Pallet storage system 10 includes one or more racks (e.g., three racks 12, 14, 16) or other suitable support structure(s), first and second spaced-apart roller tracks 20, 30 supported on racks 12, 14, 16, at least one brake mechanism 100 operably associated with each roller track 20, 30, and a stop 40 disposed at the unloading end 24, 34 of each roller track 20, 30, respectively.

Racks 12, 14, 16 are configured to support roller tracks 20, 30 thereon at an elevated position relative to the floor and at an inclined angle relative to the floor, wherein loading ends 22, 32 of roller tracks 20, 30 are elevated relative to unloading ends 24, 34, respectively, thereof.

Roller tracks 20, 30 function as the conveyor of pallet storage system 10, are similar to one another and, as noted above, are spaced-apart relative to one another. Each roller track 20, 30 is configured to support a portion of a pallet "P" thereon to facilitate translation of the pallet "P" therealong from loading ends 22, 32 of roller tracks 20, 30 to unloading ends 24, 34, respectively, thereof. To accomplish this, each roller track 20, 30 includes a support rail 26, 36 supporting a plurality of rollers 28, 38 thereon or therein along the length thereof. Rollers 28, 38 are rotatably coupled to support rails 26, 36, respectively, and are transversely arranged relative thereto to facilitate reduced-friction translation of the pallet "P" along support rails 26, 36 from loading ends 22, 32 of roller tracks 20, 30 to unloading ends 24, 34, respectively, of roller tracks 20, 30. Alternatively, other suitable components facilitating reduced-friction translation are also contemplated, e.g., conveyor belts. Further, rather than a pair of spaced-apart roller tracks 20, 30, a single, widened track supporting rollers, conveyors, or the like, may be provided.

Stops 40 are engaged to rack 16 and/or unloading ends 24, 34 of roller tracks 20, 30 to inhibit a pallet "P" from rolling off unloading ends 24, 34 of roller tracks 20, 30, respectively. Rather, a pallet "P" loaded onto roller tracks 20, 30 is translated therealong to unloading ends 24, 34 of roller tracks 20, 30, wherein the pallet "P" comes to rest in abutment with stops 40.

Turning now to FIGS. 2 and 3, in conjunction with FIG. 1, as noted above, pallet storage system 10 includes at least one brake mechanism 100 operably associated with each roller track 20, 30. In embodiments, a plurality of brake mechanisms 100 are spaced-apart along the lengths of roller tracks 20, 30. The brake mechanisms 100 of roller tracks 20, 30 may be arranged as aligned pairs, or may be offset relative to one another. The particular positioning, number, and/or distance between brake mechanisms 100 may be selected based on, for example, the incline angle of roller tracks 20, 30, the length of roller tracks 20, 30, the weight of the pallets "P" configured for storing on roller tracks 20, 30, the weight distribution of the pallets "P," and/or other factors. Brake mechanisms 100 may be disposed on the inwardly-facing sides of roller tracks 20, 30 (as illustrated), may be disposed on the outwardly-facing sides thereof, or may be disposed on both the inwardly and outwardly-facing sides of roller tracks 20, 30.

Continuing with reference to FIGS. 2 and 3, each brake mechanism 100 is similar (although the brake mechanisms 100 may be adjusted to different spring force settings, as detailed below), and thus, a single brake mechanism 100 is described below, referred to in the singular. Although brake mechanism 100 is described as associated with roller track 30, it is understood that brake mechanisms 100 associated with roller track 20 include similar features and function in a similar manner. Brake mechanism 100 generally includes a leg 110, a pivot bar 120, a retention bar 130, a biasing member 140, a rod 150, a block 160, and an adjuster 170.

Leg 110 of brake mechanism 100 defines a generally L-shaped configuration including an upright portion 112 and a foot portion 114 disposed in generally perpendicular orientation (e.g., within about 30 degrees of perpendicular) relative to upright portion 112. Leg 110 defines a U-shaped transverse cross-sectional configuration including a base and a pair of spaced-apart sides extending from the base, although other configurations are also contemplated. Upright portion 112 of leg 110 defines a stop surface 116, e.g., defined as the outwardly-facing surface of the base of the U-shaped transverse cross-sectional configuration of leg 110. Upright portion 112 of leg 110 is pivotably supported on pivot bar 120 to enable pivoting of leg 110 between a stop position, wherein stop surface 116 is generally-vertically oriented (e.g., within about 30 degrees of vertical) and extends above the adjacent support rail 36, and a go position, wherein stop surface 116 is generally-horizontally oriented (e.g., within about 30 degrees of horizontal) so as not to extend above the adjacent support rail 36. Pivot bar 120 extends between the opposing spaced-apart sides of upright portion 112 of the U-shaped transverse cross-sectional configuration of leg 110. Foot portion 114 of leg 110 supports retention bar 130 thereon, with retention bar 130 extending between the opposing spaced-apart sides of foot portion 114 of the U-shaped transverse cross-sectional configuration of leg 110.

Pivot bar 120, as noted above, pivotably supports upright portion 112 of leg 110 thereon and extends between the opposing spaced-apart sides of upright portion 112 of the U-shaped transverse cross-sectional configuration of leg 110. Pivot bar 120 further extends from one of the opposing spaced-apart sides of upright portion 112 of the U-shaped transverse cross-sectional configuration of leg 110 to enable pivotable coupling of pivot bar 120 to the adjacent support rail 36. As such, pivot par 120 pivotably couples leg 110 to support rail 36 of roller track 30 to enable pivoting of leg 110 between the stop and go positions. Pivot bar 120 may be configured as a nut retained in position extending through apertures defined within the support rail 36 and leg 110 via the head of the nut at one end and a bolt at the other end, or may define any other suitable configuration.

Retention bar 130, as noted above, extends between the opposing spaced-apart sides of foot portion 114 of the U-shaped transverse cross-sectional configuration of leg 110. Retention bar 130 is spaced apart from pivot bar 120 such that, as leg 110 is pivoted leg 110 between the stop and go positions, retention bar 130 is moved relative to support rail 36 between a first position and a second position. Retention bar 130 may be configured as a nut retained in position extending through apertures defined within the leg 110 via the head of the nut on one side of the U-shaped transverse cross-sectional configuration of leg 110 and a bolt on the other side, or may define any other suitable configuration.

Referring still to FIGS. 2 and 3, biasing member 140 may be configured as a coil spring (as illustrated) and, more specifically, an extension coil spring, or may be any other suitable biasing member, e.g., a resiliently flexible material, flat spring, spring washer, compression coil spring, etc. Biasing member 140 defines a first end 142 engaged to, e.g., looped around or otherwise engaged to, retention bar 130 between the opposing sides of the U-shaped transverse cross-sectional configuration of leg 110, and a second end 144 engaged, e.g., looped around or otherwise engaged, to rod 150. Thus, as detailed below, movement of retention bar 130 away from rod 150, e.g., from the first position to the second position, applies an elongating force to biasing member 140, against the bias of biasing member 140.

Rod 150 of brake assembly 100 includes a first end 152 and a second end 153. First end 152 defines an engagement portion 154, e.g., a loop, configured to facilitate engagement of second end 144 of biasing member 140 thereto. Rod 150 further includes a shank portion 156 extending from engagement portion 154 to second end 153 of rod 150. Shank portion 156 may include threading 158 disposed thereon and/or defined therein along at least a portion of a length thereof, or may include any other suitable features to enable incremental or continuous positioning of adjuster 170 along a portion of the length of shank portion 156 of rod 150.

Block 160 of brake mechanism 100 is fixedly engaged, e.g., bolted or otherwise secured, to support rail 36 and defines a lumen (not explicitly shown) extending therethrough. Lumen defines a diameter greater than a diameter of shank portion 156 of rod 150 (including threading 158) to enable shank portion 156 of rod 150 to extend therethrough in slidable relation relative to block 160. Block 160 defines a length relative to rod 150 to enable rod 150 to extend completely through block 160 with the free second end 153 of shank portion 156 of rod 150 extending from block 160.

With continued reference to FIGS. 2 and 3, adjuster 170 is engaged about the free end portion of shank portion 156 of rod 150 that extends from block 160. Adjuster 170 may be configured as a nut including internal threading (not explicitly shown) disposed thereon and/or defined therein to enable threaded engagement of adjuster 170 about shank portion 156 of rod 150. As such, adjuster 170 may be moved along shank portion 156 of rod 150 to a desired position by rotating adjuster 170 relative to rod 150. Alternatively, adjuster 170 and rod 150 may include any other suitable features to enable incremental or continuous positioning of adjuster 170 along a portion of the length of shank portion 156 of rod 150.

Adjuster 170 defines a diameter greater than that of the lumen of block 160 and, thus, is inhibited from passing through the lumen. As such, adjuster 170 serves to maintain second end 153 of rod 150 externally of block 160. By moving adjuster 170 along shank portion 156 in either direction, the spacing between second end 153 of rod 150 and block 160 can be varied. As this spacing is varied, engagement portion 154 of rod 150 is moved relative to leg 110, thus altering the pre-tension on biasing member 140 and, accordingly, the spring force required to be overcome to pivot leg 110 from the stop position to the go position. More specifically, with adjuster 170 disposed further towards first end 152 of rod 150, rod 150 is positioned closer to block 160, a greater pre-tension force is applied to biasing member 140 and, thus, a greater spring force is required to be overcome to pivot leg 110 from the stop position to the go position. On the other hand, with adjuster 170 disposed further towards second end 153 of rod 150, rod 150 is positioned closer to leg 110, biasing member 140 is under less pre-tension force and, thus, a lesser spring force is required to be overcome to pivot leg 110 from the stop position to the go position.

Figure 4:
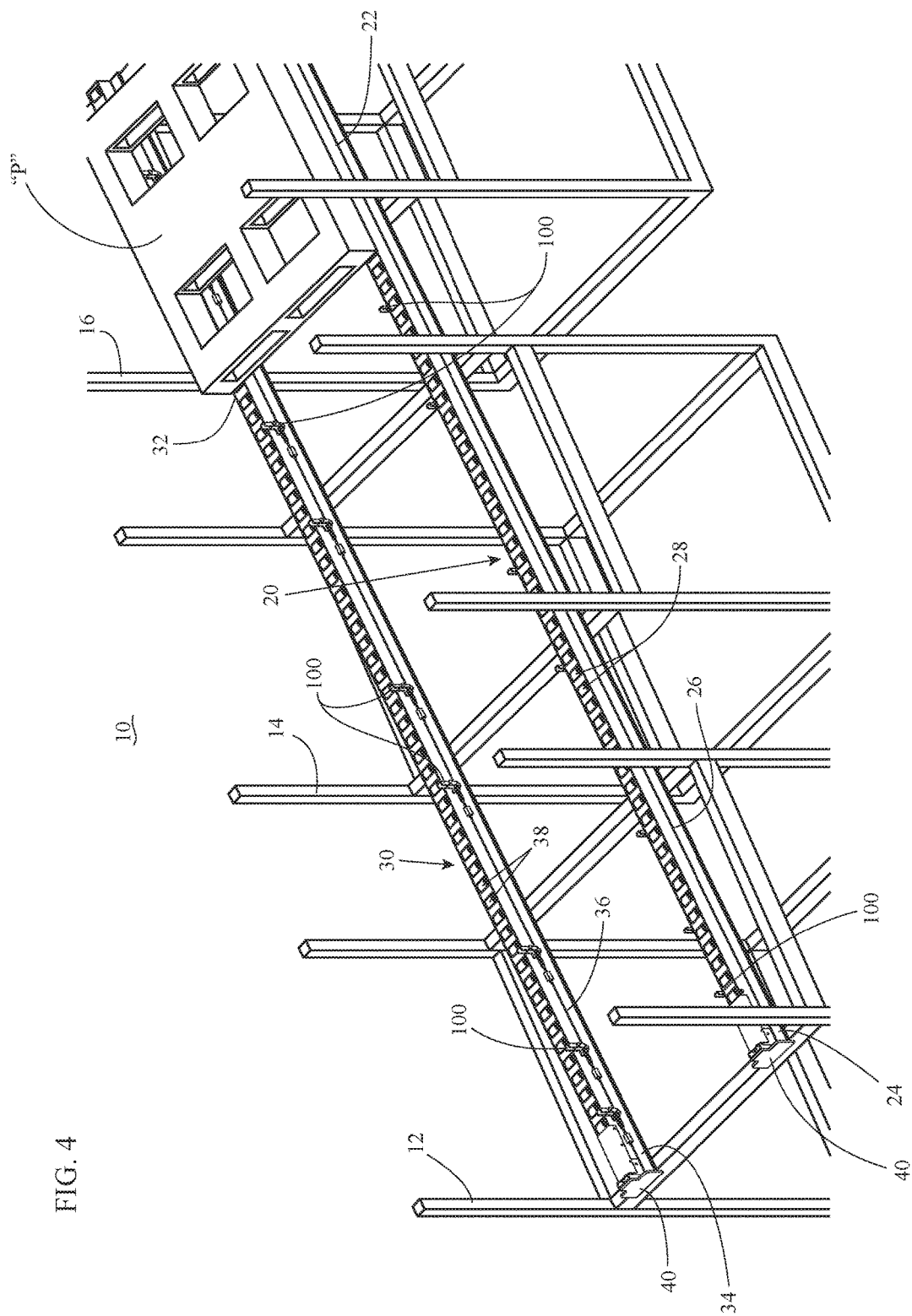
FIG. 4 is a perspective view of the pallet storage system of FIG. 1 including a pallet being loaded thereon.
Figure 5:
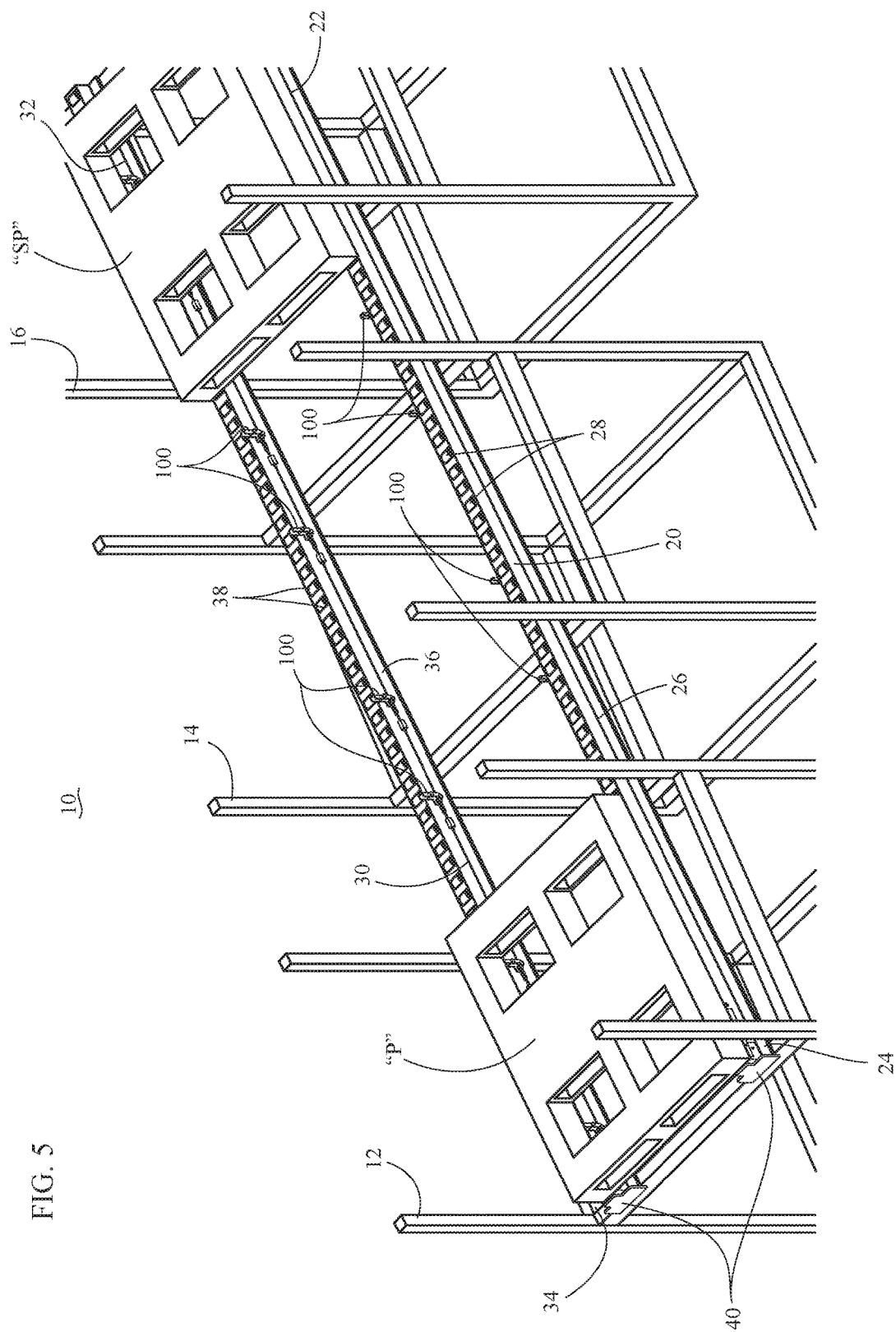
FIG. 5 is a perspective view of the pallet storage system of FIG. 1 including the pallet loaded thereon and a subsequent pallet being loaded thereon.

Turning now to FIGS. 4 and 5, in conjunction with FIG. 3, in use, a pallet "P" is loaded onto loading ends 22, 32 of roller tracks 20, 30 and is released, allowing the pallet "P" to translate along roller tracks 20, 30 towards the unloading ends 24, 34, respectively, thereof, under gravity. As the pallet "P" travels under gravity along roller tracks 20, 30, the pallet "P" picks up speed. However, brake mechanism 100 serve as speed reducers to inhibit the pallet "P" from reaching a potentially dangerous high-rate of speed.

As the pallet "P" reaches, for example, a set of brake mechanisms 100 on roller tracks 20, 30, respectively, the pallet "P" contacts stop surfaces 116 of upright portions 112 of legs 110 of brake mechanisms 100, which provide an opposing force to the pallet "P." The weight of the pallet "P" and gravity, however, are sufficient to overcome this force, urging stop surfaces 116 towards the unloading ends 24, 34 of roller tracks 20, 30, thereby pivoting legs 110 from the stop position to the go position and, in the process, elongating biasing members 150 against the spring biases thereof. Pivoting legs 110 from the stop position to the go position moves stop surfaces 116 out of the path of the pallet "P," thus enabling the pallet "P" to pass over the brake mechanisms 100 and continue along roller tracks 20, 30. However, the speed of the pallet "P" is reduced as the pallet "P" contacts and, eventually, overcomes the brake mechanisms 100, due to the force required to pivot legs 110 from the stop position to the go position. As this force required to be overcome can be adjusted, via adjusting the position of adjuster 170 relative to rod 150, a magnitude of the reduction in speed of the pallet "P" can be controlled by adjusting the position of adjuster 170 accordingly.

Once the pallet "P" clears the brake mechanisms 100, the biasing members 150 are returned to their initial (at-rest or pre-tensioned) positions, thereby returning legs 110 to the stop positions. Thus, brake mechanisms 100 may then serve to reduce the speed of subsequent pallets "SP" loaded onto and moving along roller tracks 20, 30. By virtue of brake mechanisms 100, pallets "P," "SP" are maintained at safe speeds as they move along roller tracks 20, 30 to abut stops 40 and/or stack up against previously-loaded pallets "P," "SP."

Referring generally to FIGS. 1-5, as a result of the above-detailed configuration of brake mechanisms 100, the force required to pivot legs 110 from the stop position to the go position for each brake mechanism 100 is dependent upon the pre-tension force of biasing member 140, which, as detailed above, can be adjusted by adjusting the position of adjuster 170 relative to rod 150. Thus, each brake mechanism 100 can be customized to a particular pre-tension force and, as a result, can be customized to ensure that the speed of a pallet "P," "SP" is maintained at safe speeds regardless of the configuration of the pallet "P," "SP," e.g., the weight or weight distribution of the pallet, etc., and/or of the system 10, e.g., the lengths of the roller tracks, the incline of the roller tracks, the number of brake mechanisms utilized, the layout of the brake mechanisms, etc.

Persons skilled in the art will understand that the features specifically described herein and shown in the accompanying figures are non-limiting exemplary embodiments, and that the description, disclosure, and figures should be construed merely as exemplary of particular embodiments. It is to be understood, therefore, that the present disclosure is not limited to the precise embodiments described, and that various other changes and modifications may be effected by one skilled in the art without departing from the scope or spirit of the disclosure. Additionally, the elements and features shown or described in connection with certain embodiments may be combined with the elements and features of certain other embodiments without departing from the scope of the present disclosure, and that such modifications and variations are also included within the scope of the present disclosure. Accordingly, the subject matter of the present disclosure is not limited by what has been particularly shown and described.

What is claimed is:

1. A brake mechanism for a pallet storage system, the brake mechanism comprising:
    a leg defining a stop surface, the leg movable between a stop position, wherein the stop surface is disposed within a travel path of a pallet traveling along a pallet storage system, and a go position, wherein the stop surface is displaced from the travel path; and
    a biasing mechanism having an initial biasing spring force, the biasing mechanism coupled to the leg and configured to apply the initial biasing spring force to the leg to maintain the leg in the stop position such that a force greater than the initial biasing spring force is required to urge the leg to move from the stop position to the go position, wherein the biasing mechanism is selectively adjustable to vary the initial biasing spring force, thereby varying the force required to urge the leg to move from the stop position to the go position.

2. The brake mechanism according to claim 1, wherein the biasing mechanism includes an adjuster to enable selective adjustment of the initial biasing spring force of the biasing mechanism, thereby enabling selective adjustment of the force required to urge the leg to move from the stop position to the go position.

3. The brake mechanism according to claim 2, wherein the biasing mechanism includes an extension coil spring, and wherein moving the adjuster varies a pre-tension on the extension coil spring, thereby varying the initial biasing spring force of the biasing mechanism and, thus, varying the force required to urge the leg to move from the stop position to the go position.

4. The brake mechanism according to claim 2, wherein the biasing mechanism includes a biasing member coupled to the leg at first end and to a rod at a second end, and wherein the adjuster is disposed about the rod and selectively movable to move the rod relative to the leg, thereby varying a pre-tension on the biasing member to, in turn, vary the initial biasing spring force of the biasing mechanism and, thus, vary the force required to urge the leg to move from the stop position to the go position.

5. The brake mechanism according to claim 4, wherein the adjuster is threadingly engaged about the rod.

6. The brake mechanism according to claim 4, wherein the biasing mechanism further includes a block, the rod extending through the block with the adjuster disposed on a first side of the block and the biasing member disposed on a second side of the block.

7. The brake mechanism according to claim 1, wherein the leg is pivotable between the stop position and the go position.

8. The brake mechanism according to claim 1, wherein, in the stop position, the stop surface is generally vertically oriented and wherein, in the go position, the stop surface is generally horizontally oriented.

9. A pallet storage system, comprising:
    at least one rack;
    at least one a conveyor supported on the at least one rack, the at least one conveyor disposed at an angle such that a loading end of the conveyor is inclined relative to an unloading end of the conveyor, the at least one conveyor defining a pallet travel path therealong; and
    at least one brake mechanism operably coupled to the at least one conveyor, the at least one brake mechanism including:
        a leg defining a stop surface, the leg movable between a stop position, wherein the stop surface is disposed within the travel path, and a go position, wherein the stop surface is displaced from the travel path; and
        a biasing mechanism having an initial biasing spring force, the biasing mechanism coupled between the leg and the at least one conveyor and configured to apply the initial biasing spring force to the leg to maintain the leg in the stop position such that a force greater than the initial biasing spring force is required to urge the leg to move from the stop position to the go position, wherein the biasing mechanism is selectively adjustable to vary the initial biasing spring force, thereby varying the force required to urge the leg to move from the stop position to the go position.

10. The pallet storage system according to claim 9, wherein the at least one conveyor includes at least one roller track.

11. The pallet storage system according to claim 9, wherein the at least one conveyor includes a pair of spaced-apart roller tracks.

12. The pallet storage system according to claim 9, wherein the at least one brake mechanism includes a plurality of aligned pairs of brake mechanisms disposed along the lengths of the spaced-apart roller tracks.

13. The pallet storage system according to claim 9, wherein the biasing mechanism includes an adjuster selectively movable to vary the initial biasing spring force of the biasing mechanism, thereby enabling selective adjustment of the force required to urge the leg to move from the stop position to the go position.

14. The pallet storage system according to claim 13, wherein the biasing mechanism includes an extension coil spring, and wherein moving the adjuster varies a pre-tension on the extension coil spring, thereby varying the initial biasing spring force of the biasing mechanism and, thus, varying the force required to urge the leg to move from the stop position to the go position.

15. The pallet storage system according to claim 13, wherein the biasing mechanism includes a biasing member coupled to the leg and at first end and to a rod at a second end, and wherein the adjuster is disposed about the rod and selectively movable to move the rod relative to the leg, thereby varying a pre-tension on the biasing member to, in turn, vary the initial biasing spring force of the biasing mechanism and, thus, vary the force required to urge the leg to move from the stop position to the go position.

16. The pallet storage system according to claim 15, wherein the biasing mechanism further includes a block, the rod extending through the block with the adjuster disposed on a first side of the block and the biasing member disposed on a second side of the block.

17. The pallet storage system according to claim 9, wherein the leg is pivotable between the stop position and the go position.

18. The pallet storage system according to claim 9, wherein, in the stop position, the stop surface is generally vertically oriented and wherein, in the go position, the stop surface is generally horizontally oriented.

* * * * *